US008342931B2

(12) United States Patent
Fleischman

(10) Patent No.: US 8,342,931 B2
(45) Date of Patent: Jan. 1, 2013

(54) GAMES OF CHANCE BASED ON EVENT DATABASES

(75) Inventor: Michael Ben Fleischman, Somerville, MA (US)

(73) Assignee: Bluefin Labs, Inc., Cambridge, MA (US)

( * ) Notice: Subject to any disclaimer, the term of this patent is extended or adjusted under 35 U.S.C. 154(b) by 0 days.

(21) Appl. No.: 13/454,736

(22) Filed: Apr. 24, 2012

(65) Prior Publication Data

US 2012/0208614 A1 Aug. 16, 2012

Related U.S. Application Data

(63) Continuation of application No. 12/877,722, filed on Sep. 8, 2010, now Pat. No. 8,187,070.

(60) Provisional application No. 61/240,763, filed on Sep. 9, 2009.

(51) Int. Cl.
*A63F 13/00* (2006.01)

(52) U.S. Cl. ................................ 463/11; 463/9; 463/31

(58) Field of Classification Search ................ 463/9, 11, 463/31
See application file for complete search history.

(56) References Cited

U.S. PATENT DOCUMENTS

| | | | | |
|---|---|---|---|---|
| 4,662,635 | A * | 5/1987 | Enokian | 463/31 |
| 4,776,593 | A * | 10/1988 | DiPersio et al. | 463/43 |
| 4,918,603 | A * | 4/1990 | Hughes et al. | 463/4 |
| 5,411,259 | A * | 5/1995 | Pearson et al. | 463/36 |
| 2009/0039601 | A1 * | 2/2009 | Carpe | 273/298 |
| 2009/0149248 | A1 * | 6/2009 | Busey et al. | 463/29 |

* cited by examiner

*Primary Examiner* — James S McClellan
(74) *Attorney, Agent, or Firm* — Fenwick & West LLP

(57) ABSTRACT

A system and method for implementing a game of chance based on historical events. The method consists of randomly selecting a set of competitors from an event database. The competitors are presented to a player. A set of criteria comprising a subset of the competitors are received from the player. The database of events is filtered to produce a set of events comprising those events that match the set of criteria. A single event is randomly selected from the set of events to determine an outcome for the game.

18 Claims, 10 Drawing Sheets

GAMES OF CHANCE BASED ON EVENT DATABASES

RELATED APPLICATIONS

This application is a continuation of U.S. patent application Ser. No. 12/877,722, filed on Sep. 8, 2010, entitled "Games of Chance Based on Event Databases", which application claims the benefit of U.S. Provisional Application No. 61/240,763, filed Sep. 9, 2009, all of which are incorporated herein by reference in their entirety.

FIELD OF THE INVENTION

The present invention relates to games of chance, and more particularly to games of chance based on selection of events from sets of historical events narrowed by the user through play.

BACKGROUND OF THE INVENTION

Sports fans are known for their large amount of informal knowledge about the outcomes of past sporting events. For an individual sports athlete, say a quarter back or a pitcher, fans may know what years the athlete played, what teams he played for, and what championship teams the athlete was a part of, as well as individual performance statistics particular to the sport, such as passing yards or touchdowns in football, earned run average, strikeouts, and home runs in baseball, and so forth. This knowledge is often acquired based on aggregations of information accrued by watching multiple seasons of play. In specific instances, a fan may know the outcome of specific plays within a game by a team or a given athlete. More generally, a fan's knowledge of the specific gameplay of an individual athlete will often be in the form of a general conception about how good an athlete is, with only a vague knowledge of specific events that form the baseline for that opinion. Demonstrating sports knowledge is also a common practice among sports fans.

Often sports fans will wager on the outcomes of the game or specific plays within the game. For examples, fans bet who will win or lose the game, or what the spread in the score will be at the end of the game between the winner or the loser. Fantasy football and baseball leagues are one example of how fans may test their knowledge. Participants in a fantasy league go through a virtual draft based on athletes from the actual league, and follow their hand-selected teams in order to try to amass the best performing team over the course of the season. Winning in a fantasy league is based on the outcome of presently occurring and soon to be occurring sports games during the current year's league play.

SUMMARY OF THE INVENTION

A sports-themed fantasy type game makes use of a database of events based on historical game play of a sport of interest to generate outcomes to player selected actions. The database stores a large collection of records about known historical outcomes of events (matchups, pairings, plays, hands, downs etc.) between athletes and teams (generally, "competitors") in a sport of interest, such that there are multiple matchups for any given combination of competitors. Players are presented with a plurality of competitors, and choose two from those presented which will face off in a matchup. The outcome of the matchup between the two competitors is determined by identifying in the database a plurality of past gameplay occurrences between the two competitors and selecting one at random to determine the outcome of the matchup. Individual players can use their knowledge of the sport to determine which prior matchups will be used in the random selection of an outcome.

One example embodiment is a fantasy football video card game. A database stores a set of football plays (events) from a given season. Each play is associated with a particular team, athlete, type of play, and outcome. A player is dealt (i.e., displayed on a display device) a number of "cards," including some number of athlete cards and some number of team cards. The athlete cards are considered offensive cards and the team cards are considered defensive cards. The player chooses one particular offensive athlete card and one particular defensive team card to form a matchup. The game selects from the database a randomly selected play from a prior NFL football game where both the selected athlete and the selected defensive team participated. The outcome of the randomly selected event determines the outcome of the matchup, with the player winning if the outcome of the selected event favored the selected offensive athlete, and losing if the outcome favored the defensive team. The player wins or loses credits based on the outcome of the matchup. Additionally, various stages of betting may be used to increase the stakes of the game (e.g., the credits potentially won or lost). The player can maximize their credits by employing their personal knowledge of football statistics to improve the odds of the matchup resulting in their favor, here the offensive.

Another example embodiment is a fantasy baseball strategy card game played by two players. Here, the database stores event data about pitches from baseball games, athletes such as a batter and pitcher associated with each pitch, and the outcome of the pitch (strike, ball, hit, etc.). Two players create matchups of pitchers and batters, with one player selecting a pitcher card and the other player selecting a batter card. The game identifies in the database the prior events (pitches) between the selected pitcher and batter, and then randomly selects one of these events to determine the outcome of the matchup, e.g., whether the batter strikes out or gets a hit. This in turn dictates whether the player selecting the batter scores points. Again, the player can maximize their points by employing their personal knowledge of baseball statistics to skew the odds of the matchup in their favor.

Generally, the game can be described as a game of chance which allows choices made by a player to impact the odds and increase their chance of winning. The game takes a set of inputs and outputs a change in score for the player. The game includes a database of historical events E from a domain of interest, where each event in E is annotated with information pertinent to the event (e.g., a particular team or athlete associated with the event). The operation of the game may be described as a function defined as: $f(E, T, A, \gamma, \phi, \phi, a)=R$, where R is the change in score in the game as a result of the outcome of a matchup. A player selects a set of annotations a. The function $f$ then selects all events from E such that $a \subset A$. In the function $f$, a represents a set of player selected criteria which can be used to filter the set of all events E to obtain a subset of events, where each event in the subset matches at least one of the annotations in a. A single event e is then randomly selected from this subset of events in order to determine the outcome of the matchup. The mapping $\gamma$ is used to generate the event type T associated with the event e, which is then used with a scoring function $\phi$ to generate a real value output R. The function $f$, along with the database E, and the various mappings $\gamma$, $\phi$, $\phi$ are implemented by various computer algorithms and databases, executed on a computer system.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 6 illustrates a sample screenshot depicting game state after the bet according to one embodiment of the present invention FIG. 7 illustrates a sample screen depicting game state before the draw according to one embodiment of the present invention. The player has opted to hold three of his five offensive athlete cards. The player will draw two new cards (one running back card, and one utility card) to replace the other two offensive cards not being held.

FIG. 8 illustrates a sample screenshot depicting game state after the draw according to one embodiment of the present invention. The player must select an offensive card to play against a defensive team card.

FIG. 9 illustrates a sample screen depicting game state after a play is selected according to one embodiment of the present invention. A play is randomly selected in which the previously selected offensive card competes against the selected defensive card. Video of the play is shown to the player.

FIG. 10 illustrates a sample screenshot after video of the play is shown according to one embodiment of the present invention. The player's credits are updated based on the outcome of the event depicted in the video. The player's credits are updated based on a scoring system.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the game will first be described in the context of two examples: a fantasy football video card game and a fantasy baseball strategy card game. The game will then be explained in a general manner that is independent of any particular embodiment. Finally, additional example embodiments of the game will be described.

Example Game 1

Fantasy Football Video Card Game

In one example embodiment of the game, the game is a fantasy football video card game (referred to as "the football card game", or simply "the game"). The game is a single player game. The goal of the game is to win credits by winning a series of hands (or matchups or pairings) where during each hand the player chooses to matchup offensive athlete cards against defensive team cards, and the outcome of the hand is determined by drawing randomly event outcomes from a database of events based on historical world National Football League™ games involving the athletes and teams represented by selected cards.

Figure 1:
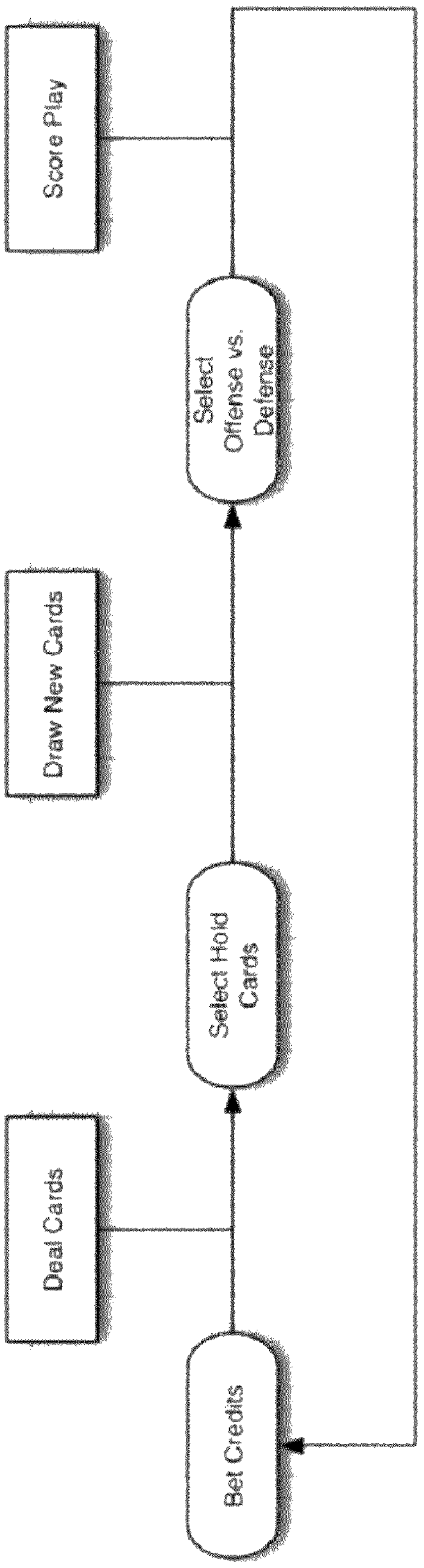
FIG. 1 is a flowchart of game play for a fantasy football card game according to one embodiment of the present invention.

FIG. 1 is a flowchart of game play for the fantasy football card game according to one embodiment of the present invention. The game is played in a series of "hands." The player begins the game with a set amount of credits. Credits are used by the player to bet at the beginning of a hand. If the player's credits ever reach zero (or less), the game ends. In one embodiment, the game may also end if the player reaches a certain amount of credits. In another embodiment, the player may end the game at any time, and withdraw their remaining credits to exchange them for real world currency or prizes that cost a predetermined amount of credits.

Game play of each hand is divided into four stages: the bet; the deal; the draw; and the play. A hand begins with the player betting credits. In one embodiment the player bets between 10 and 50 credits in 10 credit increments. Other embodiments allow the player to bet in different amounts and in different increments. The potential payout of the hand is proportional to the number of credits bet, such that the more credits the player bets, the larger the payout the winning hand will be (see Table 1 below for an example of payouts depending upon outcome).

Figure 5:
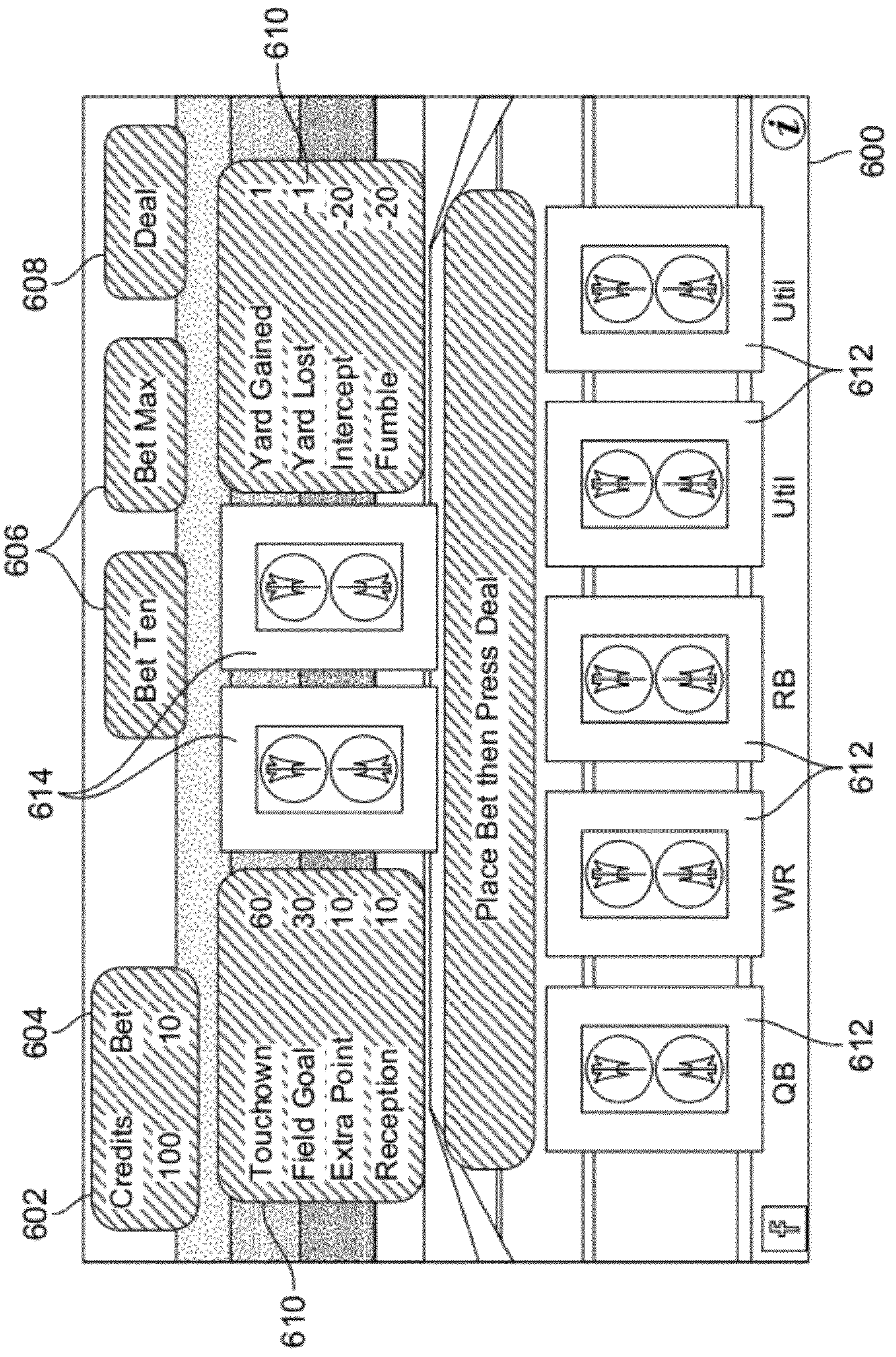
FIG. 5 illustrates a sample screenshot depicting a game state before the bet of the fantasy football video card game example embodiment.

FIG. 5 illustrates a sample screenshot 600 depicting a game state before the bet of the fantasy football video card game example embodiment. FIGS. 6-10 progressively show gameplay from a sample of this game. The current amount of credits 602 the player has is shown in the upper left, along with the player's current bet 604. The bet can be increased, and the cards dealt, using the buttons 606, 608 at top-center. The scoring table 610 for mapping play outcomes to changes in the player's credit total is shown at screen center.

Once the player places a bet, seven cards 612, 614 are dealt. Five cards 612 ("QB", "WR", "RB", "Util", "Util") are offensive athlete cards that make up the player's hand, and the two defensive athlete cards (shown in the center) against which the player's offense will be played. The five offensive athlete cards are also referred to as the offensive cards (or alternatively, as the player's hand). The two defensive athlete cards 614 are also referred to as the defensive cards. The term "card" does not necessarily denote a physical object, but can describe any type of real or virtual object that acts in the described manner. In the illustrated embodiment, the screenshot 600 and its components, are generated by a computer program; the cards are associated with underlying data representing athletes and teams and stored in a database (not shown).

Figure 6:
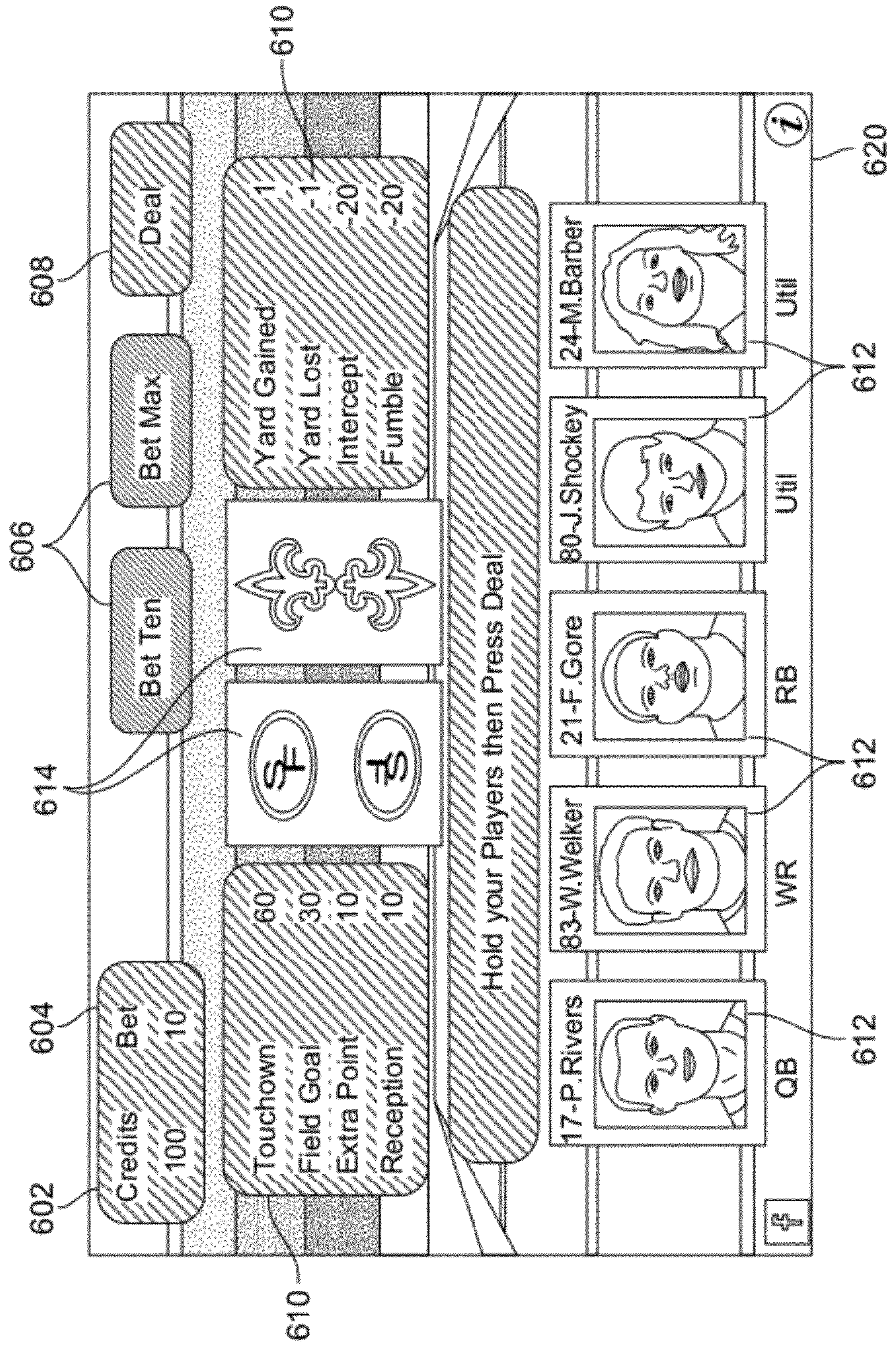
FIGS. 6-10 progressively show gameplay from a sample of this game.

FIG. 6 illustrates a sample screenshot 620 depicting game state after the player has placed a bet, and the cards have been dealt using the deal button 608. The five offensive athlete cards 612 dealt to the player's hand are shown at screen bottom; the two defensive team cards 614 are shown as well.

Offensive cards 612 represent National Football League™ (NFL) athletes who have played in NFL games and participated in offensive plays in those games. Athletes depicted by an offensive card are drawn from one of the following positions: quarterback, wide receiver, running back, tight end, and kicker. In other embodiments, athletes depicted in offensive cards may be drawn from various other positions including, for example, tackle, guard, or center. The five offensive cards are dealt "face up" to the player, such that the player may recognize the names of the offensive athletes. The five offensive cards in the player's hand include one quarterback card ("QB"), one wide receiver card ("WR"), one running back card ("RB"), and two utility cards ("Util"). Utility cards represent players of any position.

Defensive cards 614 correspond to NFL teams, and more particularly the defensive athletes of those teams. In contrast to the offensive cards, the defensive cards do not represent individual athletes, rather they represent the defensive side of the team indicated as a whole.

The athlete cards 612 dealt to the player are drawn randomly from a set of cards representing an available pool of NFL athletes. In one embodiment, the athlete cards represent known NFL athletes. Given the long history of the NFL, however, the player or the host of the gaming system may narrow which athletes may be used as part of the game. The pool of available athletes may be narrowed on the basis of time (e.g. specific NFL years or seasons), or on the basis of particular NFL teams (e.g. the Colts), or both.

Athlete cards may also be tied to specific years (or NFL seasons) in which that athlete played. In some embodiments, the game may be played with a particular season or era in mind (e.g. 1980s NFL seasons). In these embodiments, the available athlete and teams cards available will be limited to those athletes who played during the specified time period.

Further, if a specific time period is specified for the game, there will likely be some athletes who played within the specified period, and either before or after the specified time period. For example, if the range of years for a game is 1980-1985, an athlete who played from 1983 to 1987 will be both inside and outside the specified range. In these cases, the athlete's card is included in the game, but the game only takes into account their gameplay data from the years that match the specified time period.

Athlete cards 612 may also be tied to specific NFL teams. For example, a player who is a devoted fan of a particular team may wish to play a game using only their favorite team for offensive or defensive cards. In these embodiments, the player will only be dealt athlete cards for athletes who have played for that team for either offensive or defensive cards (or both, if the player designates separate offensive and defensive teams). In these instances, the game will only take into account the athlete's NFL game play while they were on the specified team. Additionally, athlete cards 612 may be designated both on a basis of a particular team and a particular time period, the selection criteria are not mutually exclusive.

After the deal, the player has the option to draw new athlete cards, also randomly selected by the game, to replace any or all of the offensive cards in the player's hand. Offensive cards are always replaced with new cards of the same type. Thus, a quarterback card is always replaced by a different quarterback card, a utility card is always replaced by a different utility card, etc. In one embodiment, the player indicates which offensive cards they wish to hold onto, and then the game replaces the cards they have not selected with new cards.

Figure 7:
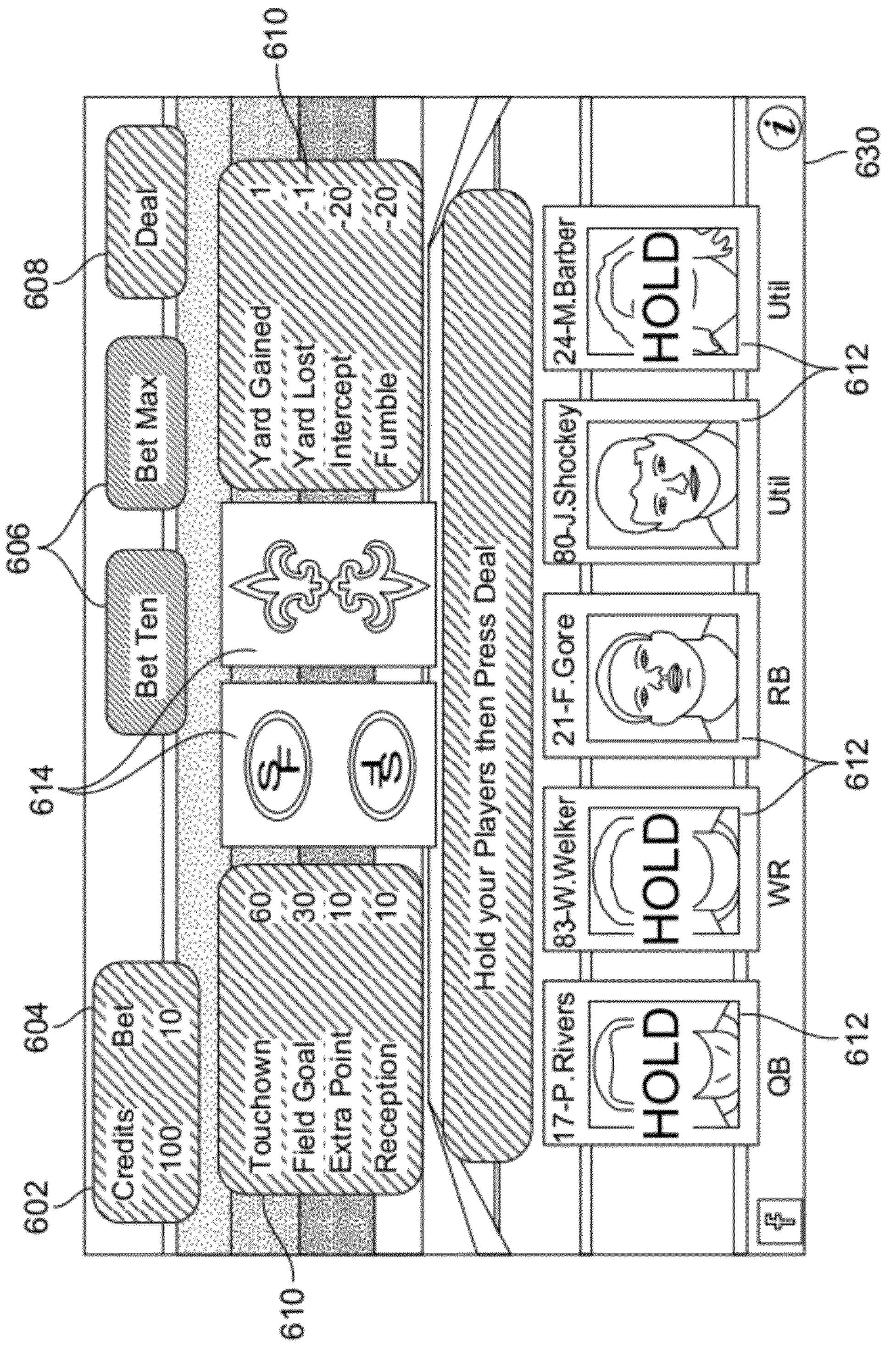

FIG. 7 illustrates a sample screenshot 630 depicting game state before the draw according to one embodiment of the present invention. The player has opted to hold three of his five offensive athlete cards 612. The player will draw two new cards (one running back card, and one utility card) to replace the other two offensive cards not being held.

After the draw, the player chooses a single offensive card from their hand to play against the defensive card 614 of their choice to form the matchup. Thus from the available cards, the player chooses a pairing of one of their offensive cards 612, and one of the defensive cards 614. The pairing represents a matchup of the individual offensive athlete against the defense of an NFL team. Once the player has drawn new cards and selected a pairing, the player's active role in the game is finished for that hand.

The pairing is associated in the database with all instances of events (i.e. plays) in which the selected offensive athlete participated in an actual NFL game against the selected defensive team, where the selected offensive player was involved in the event. The database stores data of plays from NFL Football games over the specified period (e.g., a season, or multiple seasons). Each play is annotated with information regarding the teams and players involved in the play, the type of that play (e.g. touchdown, interception, etc.), the year of the play, and the context of the play (e.g. field position, score at the time of the play, yards gained as a result of the play, etc.). The database may also include video and audio recordings of the play. For example, a play may be a down where a quarterback made a pass to a receiver.

Assume, for example that the player has selected Tom Brady as an offensive card and has selected a Raiders defensive card. The database will store events from the past where Tom Brady was involved in a play against the Raiders in actual NFL games. In this example, the pairing represents all those events where Tom Brady was involved in the play against the Raiders. While quarterbacks will frequently be involved in most plays during a game, this is not necessarily true of other positions. For example, wide receivers run their routes every down, but they are not involved in a play unless the ball is passed to them.

Figure 8:
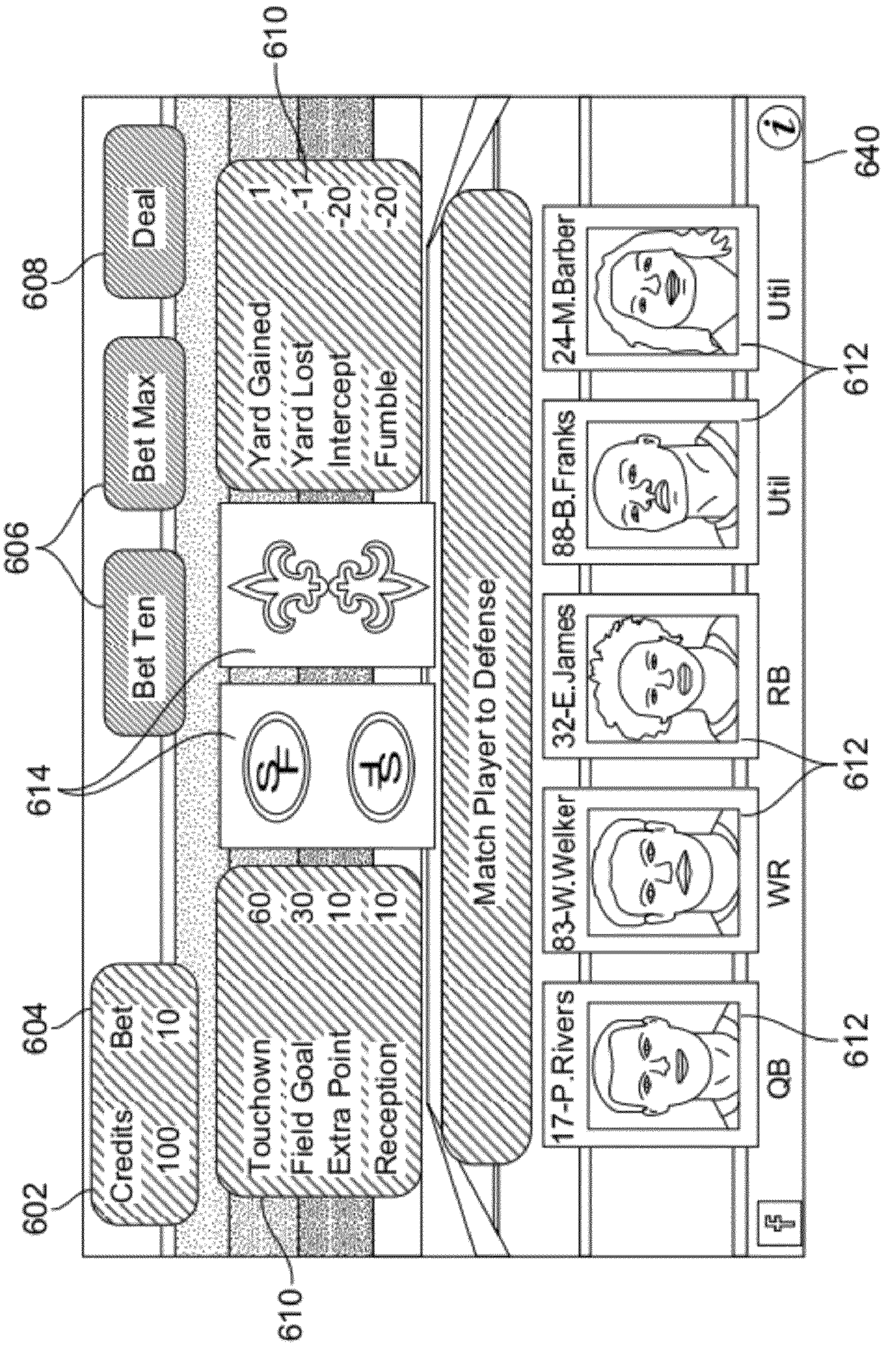

FIG. 8 illustrates a sample screenshot 640 depicting game state after the draw according to one embodiment of the present invention. At this stage, the player selects an offensive card 612 to play against a defensive team card 614.

Once this pairing has been chosen by the player, a particular event (i.e., play) is randomly selected from the set of all events associated with the pairing in the database. The set of events associated with the pairing meets two conditions. First, the selected offensive athlete is an athlete of note in that play. Athletes of note either touch the ball (e.g. quarterbacks, running backs), kick the ball (e.g. kickers), or are targets of passes (e.g. receivers). Second, the selected defensive team was the defensive team in that play.

Once a play is selected, the outcome of the play as it occurred historically is used to determine whether the player won or lost the matchup and how many credits the player gains or loses. Consider the example of a pairing of Tom Brady against the Raiders. In some instances, Tom Brady threw a pass (sometimes referred to as an "event" within a play) for a reception, and in some cases the pass resulted in a touchdown. These are just some examples of positive outcomes for a matchup. In other cases, the pass was incomplete, or worse, intercepted. These are just some examples of negative outcomes for a matchup.

Figure 9:
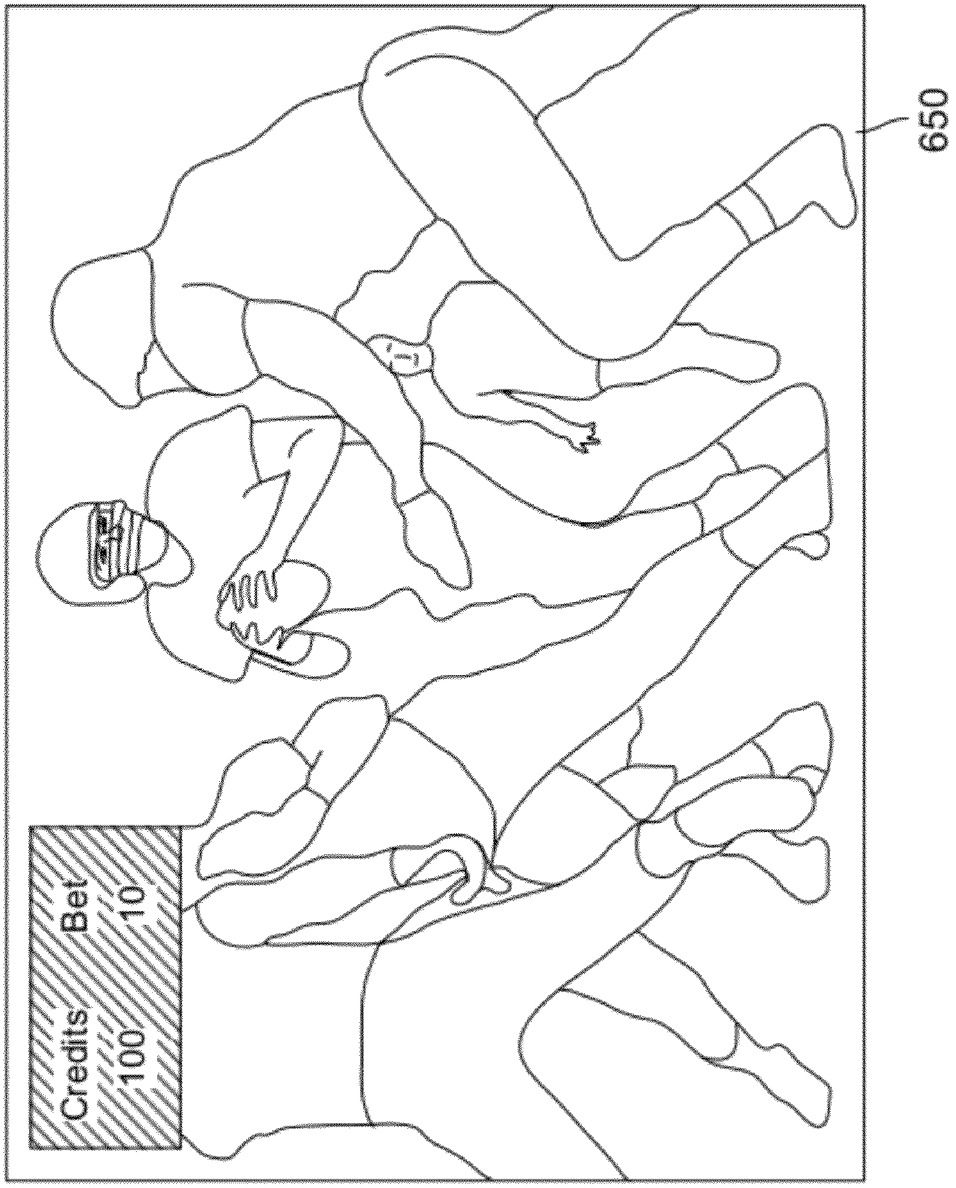

FIG. 9 illustrates a sample screenshot 650 depicting game state after a play is selected according to one embodiment of the present invention. Here, a video of the play is retrieved from the database and is shown to the player, showing the outcome of the matchup.

The player of the game uses their own knowledge of athletes, teams, and outcomes of NFL games to select pairings of offensive and defensive athletes that maximize their chances of receiving a positive outcome. Players who know which offensive athletes have performed better against which defensive teams will have an advantage in the game, and consequently will be more likely to win each hand. Even the best players, however, have thrown interceptions or missed extra point kicks, for example. Thus, a player generally cannot be sure that their pairing will necessarily result in winning a hand. The player can merely maximize their chances of winning a hand by choosing between the provided athletes the pairing that provides them the highest chance of a positive outcome.

The game comprises a scoring function for determining how many credits the player receives or loses for each possible outcome of the play. Table 1, below, illustrates an example scoring function that maps outcomes of plays to the number of credits received for that outcome, based on the size of the player's initial bet. The mappings represent a set of rules dictating a ratio of how many credits the player wins or loses with each outcome. The ratio is multiplied by the number of credits bet to determine the number of credits won or lost as a result of the outcome at the end of each hand. For example, in the example embodiment displayed in Table 1, for each multiple of 10 that a player bets, the change to the player's credits is multiplied by an additional factor of one.

TABLE 1

| | Credit Change | | | | |
|---|---|---|---|---|---|
| Outcome of event depicted in a Play | Bet of 10 | Bet of 20 | Bet of 30 | Bet of 40 | Bet of 50 |
| Touchdown | +60 | +120 | +180 | +240 | +300 |
| Field Goal | +30 | +60 | +90 | +120 | +150 |
| Extra Point | +10 | +20 | +30 | +40 | +50 |
| Reception | +10 | +20 | +30 | +40 | +50 |
| Yard Gained | +1 | +2 | +3 | +4 | +5 |
| Yard Lost | −1 | −2 | −3 | −4 | −5 |
| Interception | −20 | −40 | −60 | −80 | −100 |
| Fumble | −20 | −40 | −60 | −80 | −100 |

Examples of positive outcomes of plays include touchdowns, field goals, extra points, passing receptions, and yards gained. The breakdown of outcomes may be more fine-grained, for example, points for yards gained may scale with the number of yards gained.

Figure 10:
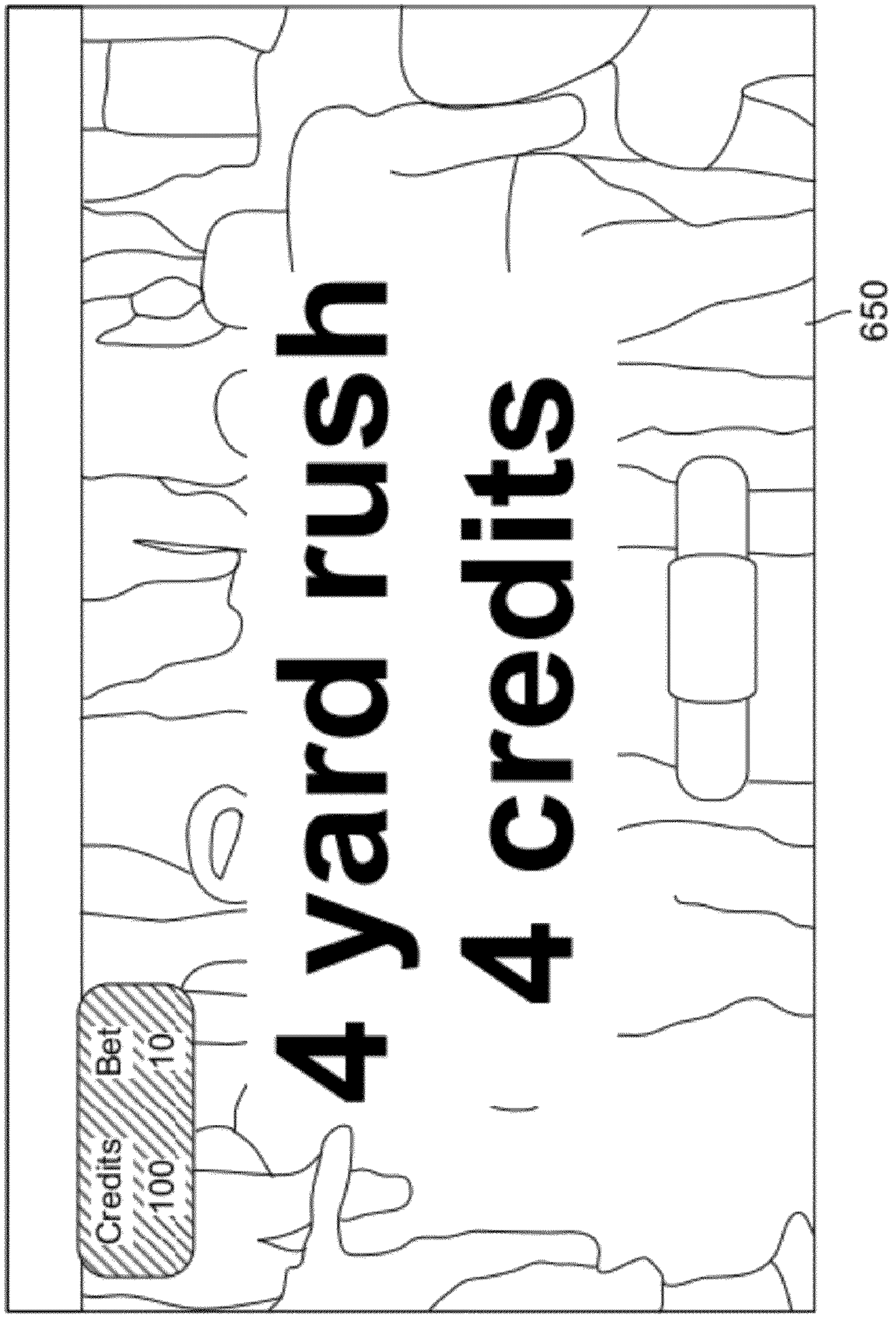

FIG. 10 illustrates a sample screenshot 660 after video of the play is shown according to one embodiment of the present invention, showing the outcome ("4 yard rush") and the number credits won ("4 credits"). The player's credits are updated based on the outcome of the event and the on a scoring function, such as is illustrated in Table 1.

By breaking down the outcome into more than just whether the outcome was positive or negative, players can make use of advanced strategies. For example, players may intentionally select an offensive athlete known for making big plays, but who is also known for taking larger risks. Thus, the player may be hoping for a bigger positive outcome at the risk of a larger negative outcome, as opposed to choosing an offensive athlete who more consistently rewards a small amount of positive points.

In some embodiments of the game, some of the offensive cards may be replaced by "power-up" cards that correspond to advanced features of plays. Advanced features of plays include, for example, information about the field position at the time of the play (e.g. "red zone" within 20 yards of the end zone) or the location of the game (e.g. the game is being played at the defensive or offensive teams home field). In some embodiments the power-up cards are automatically used if they appear, in other embodiments the player has the choice whether or not to use the power-up card, and in some cases the player can choose to save the power-up card for another hand.

Power-up cards further narrow the set of plays that match the selected pairing. The power-up card acts as a restriction on the set of plays that have occurred between a particular pairing. For example, if the pairing is Tom Brady against the Raiders, and the power-up card is a red zone card, the set of plays from which the outcome of the hand can be selected are only those plays that occurred within 20 yards of the end zone. Thus, if the player has particular knowledge of plays that have occurred with respect to a particular offensive athlete based on the restriction of the power-up card, they can increase their chances of obtaining a positive outcome. In some embodiments, the power-up cards magnify the number of credits the player may receive at the end of the hand.

Example Game 2

Fantasy Baseball Strategy Card Game

In one example embodiment of the game, the game is a fantasy baseball strategy card game (referred to as "the baseball card game", or simply "the game"). The game is played between two players who alternate roles between Pitching and Batting. The goal of the game is to achieve a higher score than one's opponent within a set amount of innings.

Figure 2:
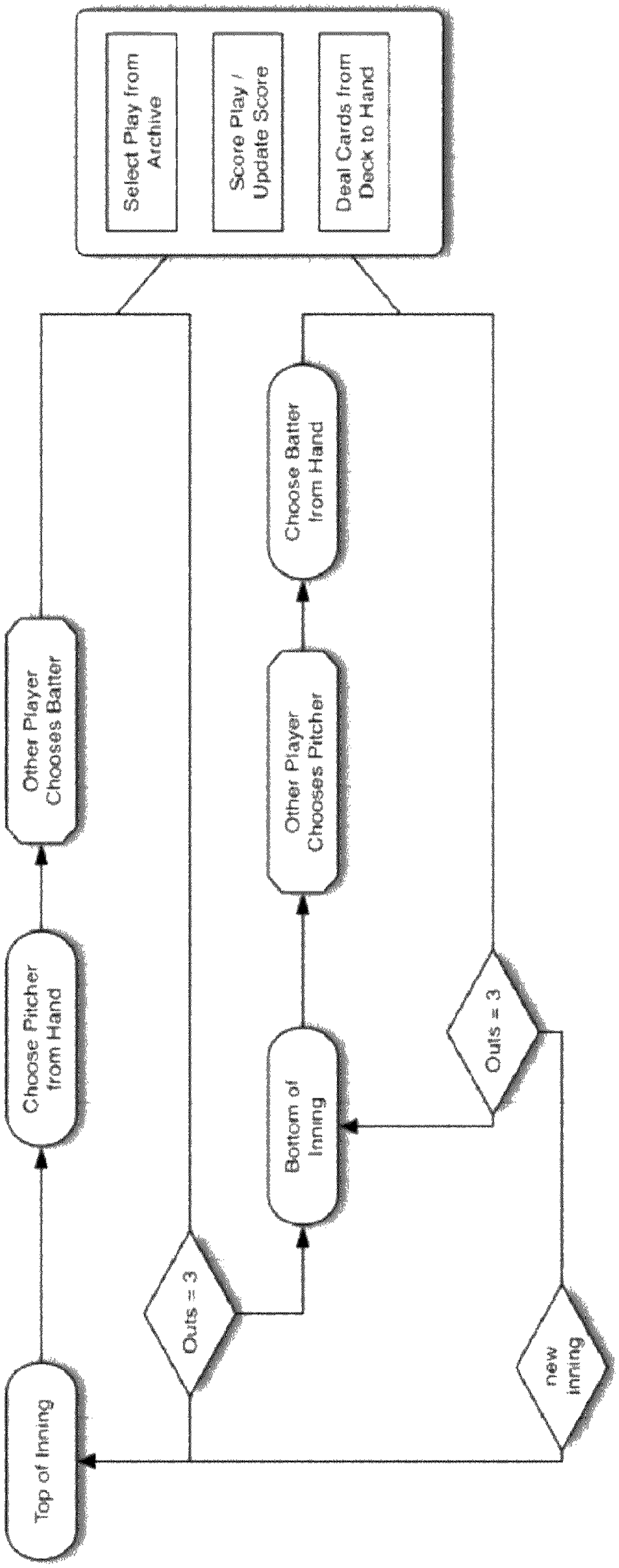
FIG. 2 is a flowchart of game play for a fantasy baseball strategy card game according to one embodiment of the present invention.

FIG. 2 is a flowchart of game play for a fantasy baseball strategy card game according to one embodiment of the present invention. In this embodiment, the game is played by two players. Each player in the game starts with a set of cards. Cards are divided into two types: pitcher cards, and batter cards. Again, the term card does not necessarily denote a physical object, but can describe any type of real or virtual object that acts in the described manner.

Pitcher and batter cards correspond to Major League Baseball™ (MLB) athletes who have either acted as batters or pitchers in a past MLB game. In some embodiments only starting pitchers may be used. Each player starts with two decks with an identical number of cards each. One deck comprises pitcher cards, the other deck comprises batter cards. The number of cards in the decks is dependent on the number of innings the players wish to play through.

Before the game, the cards in each deck are either chosen randomly or pre-selected from the player's personal collection. At the start of the game, each deck of cards is split into two sets: the starters and the bench. The starter cards are visible to the player at the start of the game, and are the only cards that can be immediately played (these cards are also referred to as the player's hand). The bench cards are the repository for all other cards in the deck that are not starter cards and have not already been played.

During the course of play, a player will play a starter card from their hand. After a starter card is played, the player replaces the missing card by drawing a new card from the appropriate bench deck (i.e. if a batter card was played, a new batter card is drawn from the bench). Although the number of cards in the bench decreases as the game progresses, the player always maintains a fixed number of starter cards in their hand. In one embodiment, each player maintains 10 starter cards in their hand at any given time, including five batters and five pitchers.

In one embodiment, bench cards are grouped according to the positions that each batter plays (e.g. catcher, first baseman, left fielder). In such embodiments, the player maintains a consistent set of positions in his hand at all times. As cards are used, the player must select a card to fill the position that the previously played card had filled. For example, if a player plays a card filling the "catcher" position, they must draw a new card from the catcher bench deck. If a player plays more than one position, they may exist in multiple bench decks of different positions.

Game play is broken into a series of innings. Each inning has a top half and a bottom half. At the start of the game, a "home team" player is selected. This player begins the top half of the inning as the pitching team (or pitching player). The player who is not selected becomes the "away team" player. This player begins the top half of the inning as the batting team (or batting player). At the end of each inning half, the players switch roles such that the pitching team becomes the batting team, and vice versa.

Game play during each inning half comprises a series of matchups (or "at-bats"). The player who is the current pitching team begins a matchup by selecting a pitcher card from their hand and revealing it to the batting player. The batting player then selects an eligible batter card from their hand to play against the pitcher.

The batting player will attempt to choose a batter, from the batters they have access to in their hand, in order to maximize the chance that the matchup will result in a favorable outcome. By choosing a particular batter to face a particular pitcher, the batting player will attempt to increase the odds of a favorable outcome. Similarly, the pitching player will select a pitcher that favors a positive outcome for them. Since the pitching player must choose the pitcher before the batter chooses their player, the pitching player may need to strategize in order to prevent the batting player from increasing the odds of a favorable outcome. For example, if in the prior two matchups in an inning half, the batting player played what the pitching player believed to be the two strongest batters in their lineup, the pitching player may choose to play a weak pitcher after that to capitalize on the batting player's decisions.

Once a pitching and batting card are selected to form a matchup (pairing), a pitching event is randomly selected from the set of known matchups between those two athletes in the past from actual MLB games. Matchup information is stored in a database of pitches, and includes MLB game occurrences where the chosen batter faced off against the chosen pitcher. The outcome of one of those occurrences is randomly selected for the outcome of the current matchup. This outcome is used to adjust the score of the game and determines whether the inning continues. The outcome from the pitching event may be either at the level of the "at-bat" for the batter, or at the level of each pitch for the pitcher.

Where the outcome is for an "at-bat", the outcome of a pitching event may necessitate a change to the score. This occurs when the outcome of the selected occurrence results in the ball being put into play (i.e. in the selected MLB matchup, the batter was determined to be safe on base, or caused another player to score). Table 2 illustrates a sample mapping of occurrences (or events) where the batter was determined to be safe in the selected MLB matchup, and the resulting change in the batting player's score as a result of this outcome.

TABLE 2

| Outcome of event depicted in a pitching event | Change to Offensive Player Score |
|---|---|
| Batter hits a single | +1 |
| Batter hits a double | +2 |
| Batter hits a triple | +3 |
| Batter hits a homerun | +4 |
| Each RBI | +1 |

Example outcomes of matchups that result in a change in the batting player's (otherwise known as the offensive player) score including the batter hitting a single, double, triple, homerun or RBI. Other examples of outcomes that cause a change in score may include a walk, a bunt that results in moving a runner forward, or a sacrifice fly. The points changes listed in Table 2 are merely exemplary, and in this case are representative of the difficulty of achieving those outcomes. As in the case with the football game, rewarding more points for more difficult outcomes provides a player an additional level of strategy for which pitcher or batter to choose.

The outcome of a matchup also dictates whether the inning continues. An outcome in which the player does not safely reach base results in an out. When the batting player acquires 3 outs, the inning half is over and the pitching player and batting player switch roles. In some outcomes, for example in the case of a sacrifice fly, the outcome may result in both an out and an adjustment to the score.

As noted above, the outcome of matchup can also be determined at the pitch level rather than the at-bat level. That is, rather than looking at the higher level granularity of whether the outcome of the matchup in the real life MLB game resulted in an out or an on-base result, the outcome is determined on a pitch by pitch basis. In these embodiments, a matchup consists of a series of random selections from the entire matchup history between the batting athlete and the pitching athlete. For example, if in their entire MLB history between a batter and pitcher, the pitcher threw to the batter 27 pitches including 9 strikes, 9 balls, and 9 additional miscellaneous events such as hits, this information is used to select the outcome of each pitch individually, rather than the at-bat as a whole. In these embodiments, if the outcome of a selected pitching event results in an out, then the pitching team gets one out. If a pitching event results in a strike or ball, these are also recorded. Just as in traditional baseball, three strikes is equivalent to one out, while four balls results in a walk.

In some cases, a batter card may not be eligible to be in a matchup against the selected pitcher card. The eligibility of a batter card is based on whether there is enough data in the archive of pitches to carry out a matchup between the pitcher and the batter. In one embodiment, the threshold is whether the batter and pitcher have faced each other in a MLB game at any point in the past. If they have not, there would be no pitch or outcome information upon which to draw to play the game. In other embodiments, it may be desirable to require more than one prior outcome between a pitcher and batter for the batter to be eligible. This may be desirable in order to introduce at least some uncertainty in the outcome of the matchup. Otherwise, players may be able to know with certainty the outcome of a matchup based on a single past outcome.

As in the case with the football implementation of this game, in some embodiments the player or the host of the game may limit the available set of pitcher cards and batter cards used to form the decks for play. The set of available cards may be limited such that all of a player's cards, both batters and pitchers come from a single team. Alternatively, the available athletes may be limited to athletes who played during particular years. As above, in the case of year limitations the archive of pitches for a given athlete will be limited to their MLB game play statistics. Alternatively, the available athletes may be limited with respect to team and year.

The game may also include power-up cards that correspond to advanced features of play that occur during an at-bat. Advanced features of play include, for example, a type of pitch (e.g. "fastball") and context during at-bat (e.g. current pitch count). In some embodiments the power-ups are automatically included as part of that at-bat if they appear. In other embodiments the player has the choice whether or not to use the power-up, and in some cases the player can choose to save the power-up for another matchup.

Power-up outcomes further narrow the set of pitches that are drawn upon to determine the outcome of a matchup. For example, if the power-up card is a "3-2 pitch count with men on base and 2 outs," the set of pitches and at-bats from which the outcome of the matchup is decided can only be selected from those plays matching the power-up requirement. Depending on the pitcher and batter's respective histories, the odds of a particular matchup may change dramatically from the batting player and pitching player originally expected. Power-ups thus add to the dynamism of each matchup. In some embodiments, the power-up cards magnify the number of points scored should the batting player score. In other embodiments, if the pitcher makes it out of a power-up occurrence without allowing the batting player to score, the batting player's score may be reduced, or the pitching player's score may be increased.

The game ends when the desired number of innings have played through. The player with the highest score at the end of those innings is declared the winner.

System Architecture

The football and baseball games described above challenge game players to swing the odds in their favor by making use of their sports knowledge. By making choices about which athletes to pit against one another, players draw upon their informal knowledge of past sporting events to increase the likelihood of a particular matchup resulting in a positive outcome. Generalizing, the game player is asked to make one or more decisions that will affect the probability of an outcome.

Figure 3:
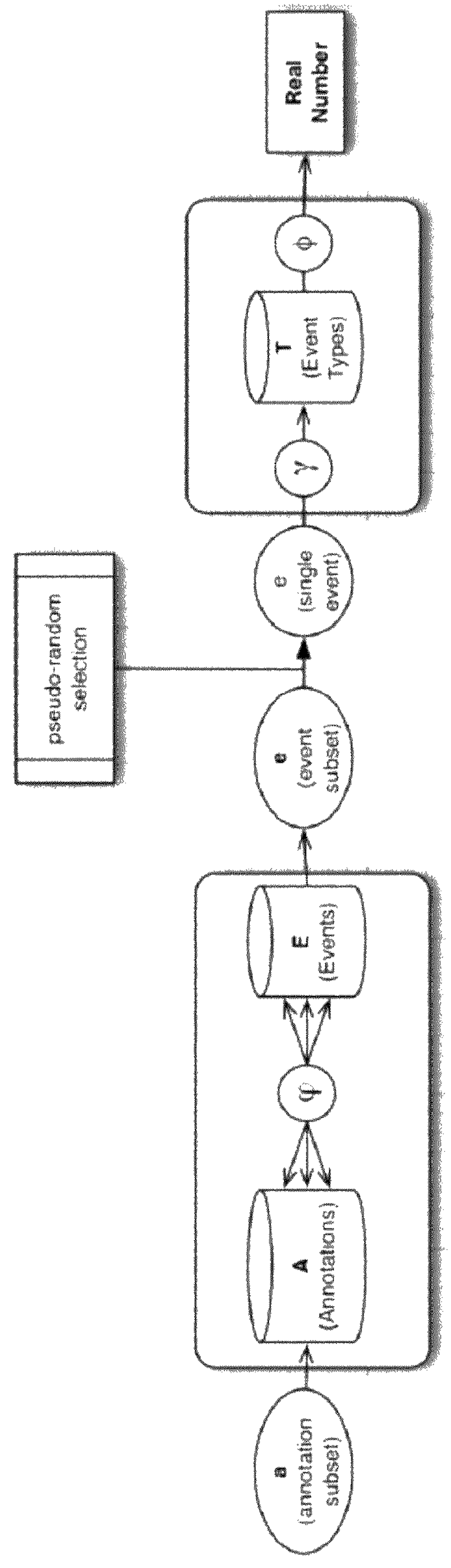
FIG. 3 is a diagram representation of a general implementation of the game using a database of events according to one embodiment of the present invention.
Figure 4:
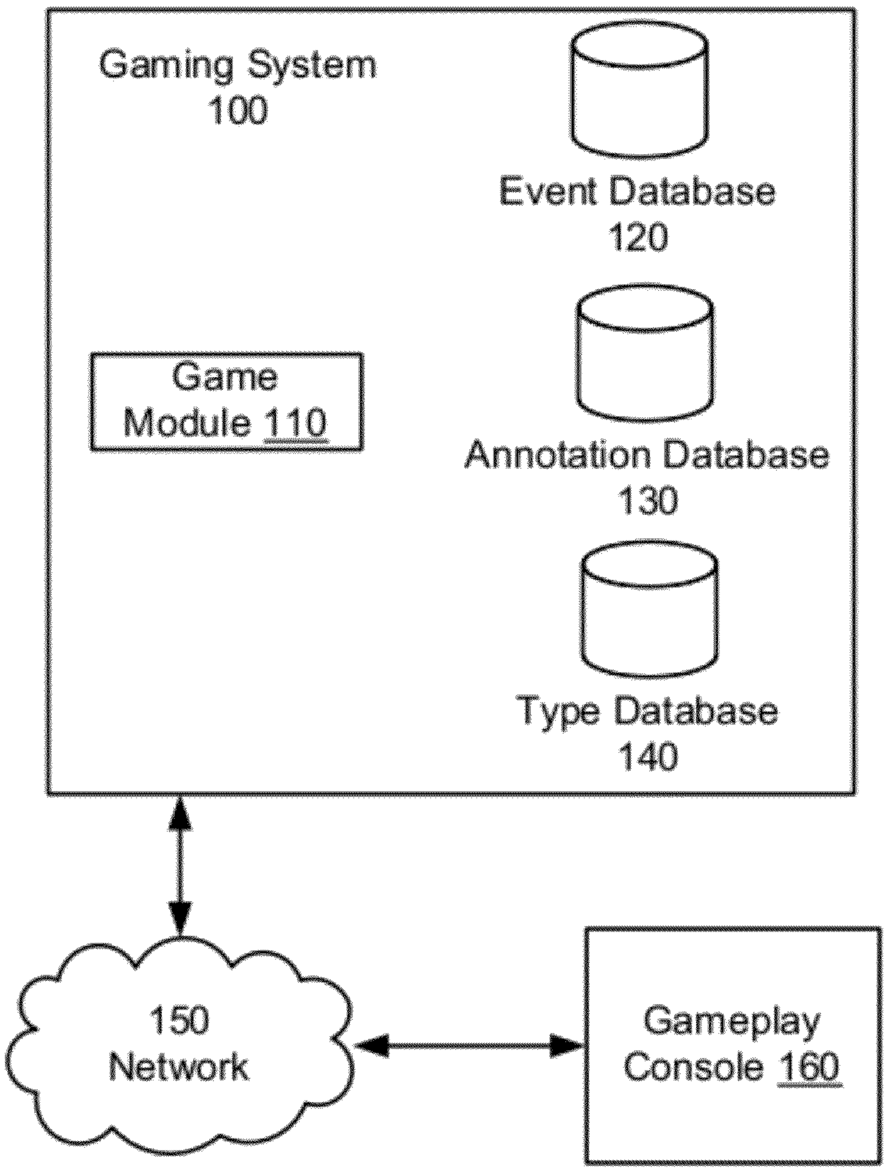
FIG. 4 illustrates a system diagram of a gaming system for playing the game according to one embodiment of the present invention.

FIG. 3 is a flowchart generalizing game play according to one embodiment of the present invention. During game play, a player makes choices, or annotations (denoted by the variable a), which restrict the set of events from which the outcome can be drawn. Examples of events vary depending upon the embodiment of the game used. In the football game case, events are downs. In the baseball game case, events may be pitches or at-bats.

The set of all events from which an outcome can be determined is denoted by a database E. In the games described above, the database E stores data representative of plays in the football game, and of pitches in the baseball game. Thus, in the case of the football game, E comprises a large collection of downs from NFL games in the selected time period as determined at the start of the game, and for any selected teams of athletes.

Each game consists of a number of matchups where the player must make a decision regarding which athletes to take part in the matchup. During these matchups, the player is presented with several options for which athletes or teams to use in the matchup. The options are collectively referred to as the annotated set A, and are colloquially referred to as the player's "hand" in the examples above. The player's hand represents a subset of data from the event database E. The player's hand, however, does not represent events (such as downs or pitches) per se, rather the player's hand is made up of cards representing athletes and/or teams (generically, "competitors") who have participated in the events stored in the event database. The player's choices a regarding which cards to play thus represents a subset of A (i.e. $a \subseteq A$).

The selection process for what teams and athletes to include in annotated set A varies depending upon the implementation of the game. In the baseball game, for example, the player's hand may be determined by shuffling a deck of cards, and randomly selecting cards from that deck, where used cards do not reappear in later hands. In other embodiments, the order of cards in the deck is pre-determined by the player before game play begins. In the case of the football game, each hand played is independently and randomly selected. The game may be implemented such that the selection of annotated set A is entirely random, or only partially random in conjunction with other predetermined factors. The variable $\phi$ encompasses all information related to the creation of A from E.

After reviewing the annotated set A, the player makes a choice regarding which players and teams to use as part of a matchup. The choice represents an election of athletes or teams from the annotated database to participate in the matchup. The game uses the choices made to determine the set of events (denoted e) that matches the player's criteria. The game then selects a single event (denoted e) from the database E that matches the player's choices. In some embodiments, the event selected may also be based on additional criteria, such as may be provided by a power-up card, for instance. The event selection is random, or pseudo-random. In one embodiment, the game is implemented using a pseudo random number generator.

Each event e has a type T of outcome associated with it. The type T dictates how the outcome affects the players. For example a touchdown event type in the football game results in the player winning credits, whereas a triple in the baseball game increases the score for the batting player. A type database T stores all of the event type information, and is correlated to be easily referenced by the event database E. The mapping of event types T to events E is encompassed in a function $\gamma$.

Once the event e and event type T are known, the outcome of the matchup can be determined. A variable $\phi$ represents a scoring function that maps event types T to real number outcomes, which are then provided to the player. For example, scoring function $\phi$ may determine that a homerun in the baseball game is worth 4 points.

Although the description above separates each matchup in the game into a series of steps and separate calculations, the matchup can also be represented by a single calculation which incorporates the choices made by the user. This calculation takes a set of inputs and outputs a score adjustment. The function is defined as: $f(E, T, A, \gamma, \phi, \phi, a)=R$, where R is the real number outcome of the game in the form of a score adjustment. R may be, for example, credits or a score increase attributed to a player. Typically, a is chosen by the players and varies throughout a game, while E, A, T, $\phi$, $\phi$ and $\gamma$ either remains static or change outside of the players control.

The player increases their odds of winning a matchup by biasing which particular outputs are generated by manipulating the choice of inputs, including the choice of annotation subset a. For many games, all inputs except for a (i.e. E, T, A, $\phi$, $\phi$, $\gamma$) are held constant. However, some game variations may not keep all other inputs constant, but may update them at will. For example, implementation of the game based on real-time events may require that E is updated as the game is being played.

Additional Examples

A wide variety of games in different domains of interest may be implemented in accordance with the description above. For example, other games may be implemented that have similar formats, but operate using different functions and content domains for E, A, T, $\gamma$, $\phi$, and $\phi$. Below are other example embodiments.

In one example, the game is based on movies. Events in E are feature films annotated with their actors, producers, directors, years, genres, etc. The scoring function ϕ maps movies to game money based on their box office proceeds. Players attempt to make the most money by laying down annotation cards in order to bias the system to select blockbusters. Opponents can sabotage other players by playing additional cards that they know will bias selection toward flops. For example, player one plays "Dustin Hoffman" hoping that "Marathon Man" will be selected. However, player two plays the year "1987" biasing the system toward selecting "Ishtar," which was a flop.

In another example, the game is based on music. This example is similar to the movies example, however, in this case events in E are songs or albums and the scoring function ϕ maps songs to their place on the Billboard™ music charts.

In another example, the game is based on stocks. Events in E are companies annotated with CEOs, markets, products, years of business, revenue and earnings, major milestones etc. The scoring function ϕ maps companies to game scores based on the annual performance change of their stock.

In another example, the game is based on politics. Events in E are votes in the House of Senate annotated with the bill being voted on, who is voting, the party of the voter, etc. The scoring function ϕ maps votes to a game score based on the margin by which the bill passed or failed.

Additional Considerations

In one embodiment, a gaming system 100 hosts an implementation of the game. The gaming system 100 may be implemented using a single computer, or a network of computers, including cloud-based computer implementations. The computers are preferably server class computers including one or more high-performance CPUs and 1 G or more of main memory, as well as 500 Gb to 2 Tb of computer readable, persistent storage, and running an operating system such as LINUX or variants thereof. The operations of the gaming system 100 as described herein can be controlled through either hardware or through computer programs installed in computer storage and executed by the processors of such servers to perform the functions described herein. The gaming system 100 includes other hardware elements necessary for the operations described here, including network interfaces and protocols, input devices for data entry, and output devices for display, printing, or other presentations of data. In some embodiments, the gaming system 100 is implemented using a mobile computing device.

To implement the game, the gaming system 100 comprises a game module 110 which implements the methods and functions described above related to the operation of the game. The game module 110 inputs and outputs data related to the game through the game system 100.

Players interact and play the game over a network 150. The network 150 is typically the Internet, but can be any network, including but not limited to any combination of a LAN, a MAN, a WAN, a mobile, a wired or wireless network, a private network, or a virtual private network.

Players play the game through a gameplay console 160. The gameplay console may merely be a television with associated remote control, a personal computer, a PDA or other mobile phone or advanced mobile phone device, a video game console, or any other device designed to operate with the gaming system 100. The gameplay console 160 comprises at least a screen which allows the player to view the game, including any video footage of actual gameplay recorded with respect to specific events from the event database 120. The gameplay console 160 additionally comprises an input device for the player to enter their input and play the game. Players may play each other, or individually.

The event database 120, annotation database 130, and type database 140 store information about previously played sporting events for use in the game. For example, the event database 120 may store all known NFL games, all available video footage of the games, and any play or down specific information needed to carry out the game. The annotation database 130 stores information about individuals for the domain of interest, such as individual athletes, movie actors, or musicians. The annotation database 130 is used to generate the cards used in the player's hands. The type database 140 stores type information for the various types of outcomes along with scoring information used by the game module 110 to implement the scoring function.

The databases can be implemented as any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here.

In this description, the term "module" when used in the context of aspects of the gaming system 100 refers to units of computational logic for providing the specified functionality. A module (such as the gameplay module 110) can be implemented in hardware, firmware, and/or software. It will be understood that the name modules described herein represent one embodiment of the present invention, and other embodiments may include other modules. In addition, other embodiments may lack various modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the system, loaded into memory, and executed by the one or more processors of the system's computers.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer implemented method for implementing a fantasy football virtual card game, comprising:

using a computer to perform each of the steps comprising:

dealing a first set of offensive cards to a player each indicating an athlete who has played in a real world football league;

dealing a set of defensive cards to a player each indicating a team in the real world football league;

receiving from the player a matchup comprising an offensive selection and a defensive selection, the offensive selection being one from the set of dealt offensive cards, and the defensive selection being one from the set of dealt defensive cards, filtering a play database comprising plays from the real world football league to generate a set of plays where the athlete represented by the offensive selection played on the offensive side in a real world football game against the team represented by the defensive selection, and where the athlete was an athlete of note in the play;

selecting randomly a play from the set of plays; and determining an outcome of the play.

2. The method of claim 1, further comprising:

receiving from the player an indication of at least one dealt offensive cards to replace;

removing the indicated offensive cards; and dealing a second set of offensive cards, whereby the number of offensive cards dealt in the second set is equal to the number of indicated offensive cards.

3. The method of claim 1, further comprising:

determining a score adjustment for the player based on the outcome of the selected play; and adjusting a player's score based on the score adjustment.

4. The method of claim 1, further comprising:

displaying video footage of the play to the player.

5. The method of claim 1, wherein an athlete of note in the play touched the ball at some point during the real world football game in which the play occurred.

6. The method of claim 1, wherein the first set of offensive cards comprises five offensive cards.

7. The method of claim 1, wherein the first set of defensive cards comprises two defensive cards.

8. The method of claim 1, wherein the first and second set of offensive cards all indicate athletes from the same team in the real world football league.

9. The method of claim 1, wherein the first set of offensive cards and the set of defensive cards all relate to play by athletes that occurred in a range of years.

10. A system for implementing a fantasy football virtual card game, comprising:

a non-transitory computer-readable storage medium for storing executable computer program instructions comprising instructions for:

dealing a first set of offensive cards to a player each indicating an athlete who has played in a real world football league;

dealing a set of defensive cards to a player each indicating a team in the real world football league;

receiving from the player a matchup comprising an offensive selection and a defensive selection, the offensive selection being one from the set of dealt offensive cards, and the defensive selection being one from the set of dealt defensive cards, filtering a play database comprising plays from the real world football league to generate a set of plays where the athlete represented by the offensive selection played on the offensive side in a real world football game against the team represented by the defensive selection, and where the athlete was an athlete of note in the play;

selecting randomly a play from the set of plays; and determining an outcome of the play.

11. The system of claim 1, wherein the storage medium further comprises instructions for:

receiving from the player an indication of at least one dealt offensive cards to replace;

removing the indicated offensive cards; and dealing a second set of offensive cards, whereby the number of offensive cards dealt in the second set is equal to the number of indicated offensive cards.

12. The system of claim 1, wherein the storage medium further comprises instructions for:

determining a score adjustment for the player based on the outcome of the selected play; and adjusting a player's score based on the score adjustment.

13. The system of claim 1, wherein the storage medium further comprises instructions for:

displaying video footage of the play to the player.

14. The system of claim 1, wherein an athlete of note in the play touched the ball at some point during the real world football game in which the play occurred.

15. The system of claim 1, wherein the first set of offensive cards comprises five offensive cards.

16. The system of claim 1, wherein the first set of defensive cards comprises two defensive cards.

17. The system of claim 1, wherein the first and second set of offensive cards all indicate athletes from the same team in the real world football league.

18. The system of claim 1, wherein the first set of offensive cards and the set of defensive cards all relate to play by athletes that occurred in a range of years.

* * * * *